March 26, 1963 W. V. H. SUSIKARI 3,082,534
NAVIGATIONAL PLOTTING AND DRAFTING DEVICE
Filed March 30, 1960 3 Sheets-Sheet 1

INVENTOR.
WILLIAM V. H. SUSIKARI
BY
Gustave Miller
ATTORNEY

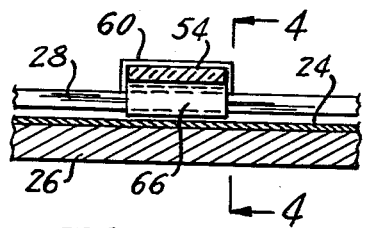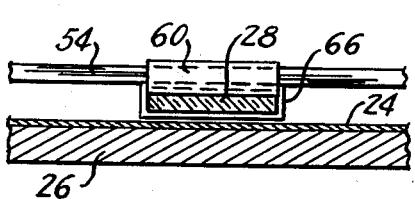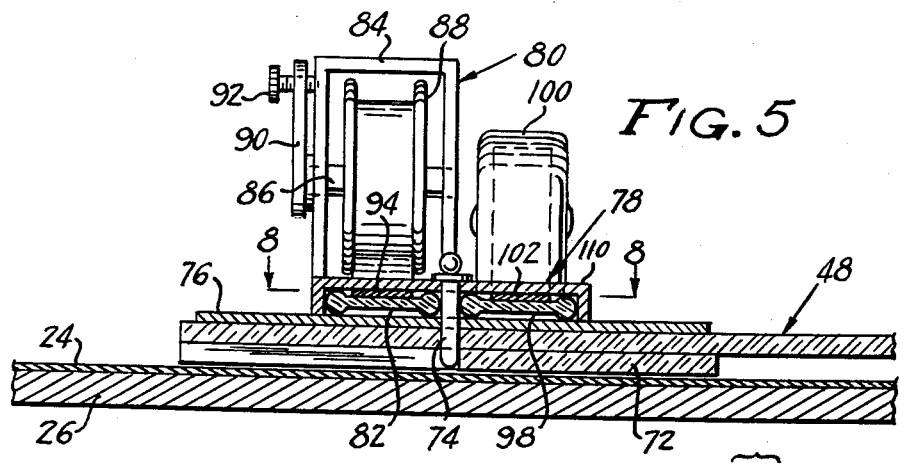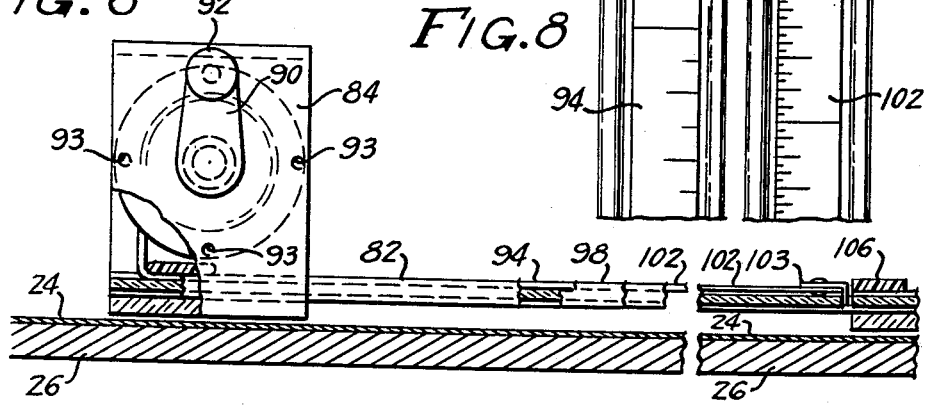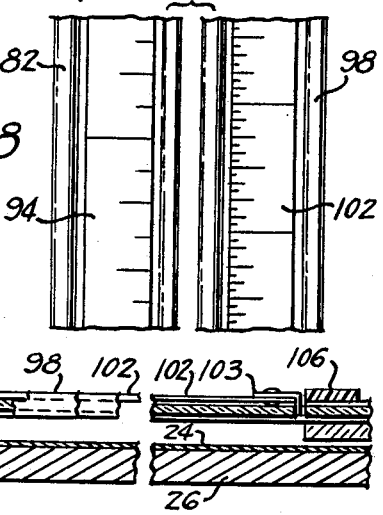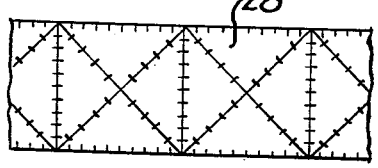
INVENTOR.
WILLIAM V. H. SUSIKARI
BY
Gustave Miller
ATTORNEY March 26, 1963     W. V. H. SUSIKARI     3,082,534
NAVIGATIONAL PLOTTING AND DRAFTING DEVICE
Filed March 30, 1960     3 Sheets-Sheet 3

INVENTOR.
WILLIAM V. H. SUSIKARI
BY
ATTORNEY

United States Patent Office 3,082,534
Patented Mar. 26, 1963

3,082,534
NAVIGATIONAL PLOTTING AND DRAFTING DEVICE
William V. H. Susikari, 4323 9th Ave., Brooklyn 32, N.Y.
Filed Mar. 30, 1960, Ser. No. 18,544
9 Claims. (Cl. 33—32)

This invention relates to a navigational measuring device, and it particularly relates to a navigational plotting and drafting device, such a device being especially useful for plotting navigational courses and the like.

Heretofore, it was the general rule that in order to plot a navigational course or the like, it was necessary to use a variety of instruments such as dividers, parallel rules, protractors, etc. Such plurality of instruments were not only difficult to handle, but were inconvenient to use and tended to sometimes become misplaced. In addition, unless great skill and care was exercised, the resultant plotted course would not always be completely accurate.

It is one object of the present invention to overcome the above as well as other disadvantages of the type of instruments previously used by providing a plotting and drafting device which is compact, easy to handle and simple in construction.

Another object of the present invention is to provide a plotting and drafting device of the aforesaid type which is easy to use and which provides completely accurate results without requiring a high degree of skill on the part of the user.

Other objects of the present invention are to provide an improved plotting and drafting device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings, in which:

FIG. 3 is a fragmentary sectional view taken on line 3—3 of FIG. 1.

FIG. 4 is a fragmentary sectional view taken on line 4—4 of FIG. 3.

FIG. 5 is a fragmentary sectional view taken on line 5—5 of FIG. 1.

FIG. 6 is a fragmentary view, partly in section and partly in elevation, taken on line 6—6 of FIG. 1.

FIG. 7 is a fragmentary sectional view taken on line 7—7 of FIG. 1.

FIG. 8 is a fragmentary view of the scaling arm.

FIG. 8A is a fragmentary view of marginal and bar scales.

Figure 1:
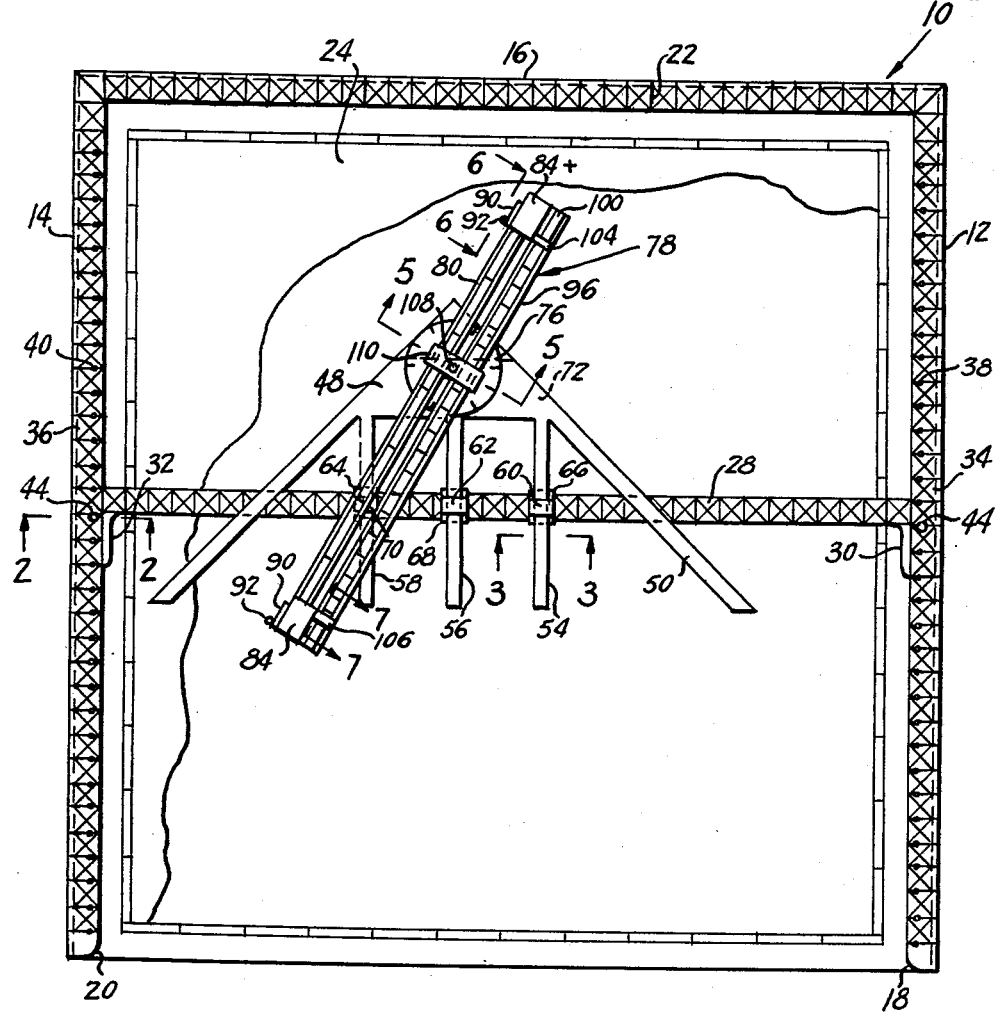
FIG. 1 is a top plan view of a device embodying the present invention.
Figure 2:
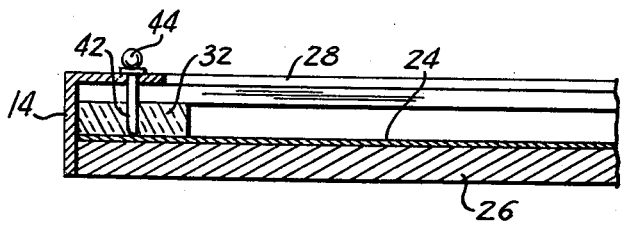
FIG. 2 is a fragmentary sectional view taken on line 2—2 of FIG. 1.

Referring in greater detail to the drawings wherein similar reference characters refer to similar parts, there is shown a frame 10 consisting of side members 12 and 14 and rear member 16. The frame 10, including its three portions 12, 14 and 16, is made of rigid plastic or metal angle members or the like wherein each of said portions has an upper horizontal web and vertical side web. The front of the frame 10 is open, this open end being defined by rounded inner edges 18 and 20 on the horizontal webs of sides 12 and 14 respectively.

The upper edge of the rear portion 16 of the frame 10 is preferably provided with a scale, such as an inch scale indicated at 22, to facilitate proper placement of a chart or the like 24 on a base or table 26. This table 26 is preferably constructed of a transparent, rigid plastic such as plexiglass or the like, and is adapted to be positioned in the frame 10 by inserting it through the open front end of the frame. The side portions 12 and 14 of the frame retain the sides of the table 26 in position, while the rear edge of the table is retained by the rear portion 16 of the frame.

Extending transversely across the frame 10 is a rule 28. This rule 28 is also formed of rigid transparent plastic such as Plexiglas and is adjustably movable longitudinally of the frame 10 by means of flanges 30 and 32 at opposite ends of the rule 28, these flanges being arranged beneath the horizontal webs of the corresponding side portions 12 and 14 respectively.

The side portions 12 and 14 are respectively provided with a scale, 34 and 36 respectively, of inch lines, and 45° diagonals extend in both directions between each inch line. In addition, the inch lines are divided into half, quarter and eighth inch markings. The transverse rule 28 is also provided with inch lines and with 45° diagonal lines extending in both directions between each inch line. In addition, the inch lines are divided into half, quarter and eighth inch markings.

The side portions 12 and 14 of the frame are provided with spaced holes, respectively shown at 38 and 40, these holes being preferably spaced an inch apart. Each flange 30 and 32 is provided with a hole, such as indicated at 42. The holes 38 and 40 in the side portions of the frame are adapted to selectively mate with the holes 42 in the flanges 30 and 32 as the rule 28 is slid back and forth so that when the rule 28 has been adjusted to the desired position, a pin, such as shown at 44, may be inserted in the corresponding mating holes in the frame and flanges to retain the rule 28 in its adjusted position.

Mounted on the transverse rule 28 is a carriage generally designated 46. This carriage 46 comprises a triangular body 48 having oppositely disposed angular extensions 50 and 52. Between these extensions 50 and 52, the body 48 is provided with three spaced, parallel legs 54, 56 and 58 extending from the base edge of the triangular body. Each of these legs slidably extends through a socket indicated respectively at 60, 62 and 64. These sockets are, in turn, slidable longitudinally of the rule 28 by means of sleeves connected to the sockets and encompassing the rule 28, these sleeves being indicated respectively at 66, 68 and 70.

The triangular body 48 is provided with a reinforcing strip 72 under its base portion and the entire body 48 is preferably constructed of rigid transparent plastic such as Plexiglas or the like.

In the center of the triangular body 48 is a pivot pin 74 which acts to retain a rotatable circular protractor 76. This protractor 76 is marked with north, south, east and west markings as well as with degree markings. The protractor 76 may be fixed in position if it is to be used only with true north, but is preferably left rotatable so it can be set to magnetic north when desired.

An auxiliary rule is provided as is generally indicated at 78. This auxiliary rule 78 comprises two laterally spaced parallel rule members. One of these rule members is indicated at 80 and comprises an elongated channel member 82 having a bracket 84 at each end. In each of these brackets 84 is mounted a shaft 86 supporting a rotatable spool 88. The shaft 86 extends through one side of the bracket 84 and this extension is provided with a rotatable handle or crank arm 90. At one end the handle 90 is threadedly apertured to receive a set screw 92. This screw 92 serves both as a finger piece for grasping the handle and as a locking means to lock the handle in position to prevent rotation of the spool 88. This is accomplished by tightening the screw 92 against the side or into one of the holes 93 of the bracket 84.

Extending between the two spools 88 at each end of the channel member 82 is a tape 94 of non-stretchable material which can be fed back and forth between the spools 88 so as to place any portion of the tape in exposed position along the rule. Since the scales of various charts differ, some charts having a scale of 1 to 80,000, some of 1 to 40,000, etc., the tape 94 is provided along its length with different portions marked with different scales. The desired scale for the particular chart is obtained by reeling the tape between the spools 88 until the desired portion having the appropriate scale is exposed. Then the set screws 92 are tightened to lock the tape. Obviously, unless the tape is long enough to extend 90°, it will be made in several sections, each section being at least long enough for a particular chart or series of charts and, of course, of the same scale as the chart or series of charts.

The other rule member of the auxiliary rule 78 is indicated generally at 96 and comprises an elongated channel member 98 laterally spaced from and parallel with channel member 82. At one end of the channel member 98 is provided a housing 100 containing a spool on which is wound a spring steel tape of any desired scale or indicia, this steel tape being indicated at 102 and having a bent finger 103 at its free end.

Adjacent the housing 100 is provided a bridge member 104 under which the tape 102 is adapted to be engaged. The channel member 98 is provided adjacent its other end with a recess 106. The steel spring tape, after being inserted under the bridge 104, is drawn along the channel member 98 and the finger 103 is inserted in the recess 106 to hold the tape 102 in position. When the finger 103 is withdrawn from the recess 106, the tape will be automatically withdrawn into the housing 100 by a torsion spring (not shown) biasing the spool within the housing 100 into a predetermined rotatable position wherein the tape 102 is wound up on the spool.

In using the invention, the proper chart 24 is placed under the frame 10 and properly aligned with the frame on the table 26. The transverse rule is then moved into a desired position with the carriage 46 in position thereon. When a bearing is taken on a known fixed position, the auxiliary rule 78 is placed over the protractor 76 at the corresponding angle and a line is drawn from the known fixed position by means of a pencil inserted through a central hole 108 in a bridge member 110 that is slidably placed over the transverse rule. The hole 108 is situated exactly between the two spaced apart rule members 80 and 96. The pencil is then drawn down to indicate the correct angle from the fixed position. A similar bearing, or angle, is taken from another fixed position by the same procedure so that a line is drawn from the other position so as to intersect the first drawn line, thereby giving the position at the place where the two lines intersect.

To measure the position, the auxiliary rule 78 is placed in alignment with a transverse degree line and the tape 94 is moved to provide a latitude scale of exactly the same type as on the chart. Then, the exact latitude can be read along the tape 94 on the chart. The longitude is determined by projecting the rule 78 onto one of the longitudinal marks at the end of the scale.

In order to plot a course between the present position of a ship and a fixed position, the protractor 76 is placed with the pivot pin 74 directly over the position of the ship. Then the rule 78 is placed over the pivot pin 74 with the pivot pin 74 being received in the space between the two parallel rule members 80 and 96. This space is of a width which is just sufficient to snugly but slidably receive the pivot pin 74 so that the pivot pin acts as a guide for the rule 78. The desired course of the ship is then determined on the protractor and rule 78 is turned so as to coincide with the desired course. The pencil is then inserted through the hole 108 in bridge 110 and the pencil point and bridge are drawn along the rule 78 to provide a course mark on the chart.

In addition to the above, many other navigational and plotting problems can be solved with the same structure. For example, four point bearings may be taken by taking a bearing at 45° to a fixed point and then, as when travelling directly east of the previous position until a point exactly 90° from the previously located fixed point is reached, it will be known that the ship is exactly the same distance from the fixed point at that time as the distance travelled between the first and second bearing. This, of course, is merely one example of the various navigational problems that may be solved.

The scale on the transverse rule 28 is provided to insure proper alignment of the three guide legs 54, 56 and 58 between the two extensions 50 and 52. The guide legs 54, 56 and 58 are also preferably provided with longitudinally extending guide marks to insure their retention in a proper direction wherein they are aligned with vertical lines on the chart as well as with the inch lines on the transverse rule 24. This is to compensate for the slackness inherent in the slidable relationship with their individual socket and guide means indicated respectively at 60—66, 62—68 and 64—70.

Figure 9:
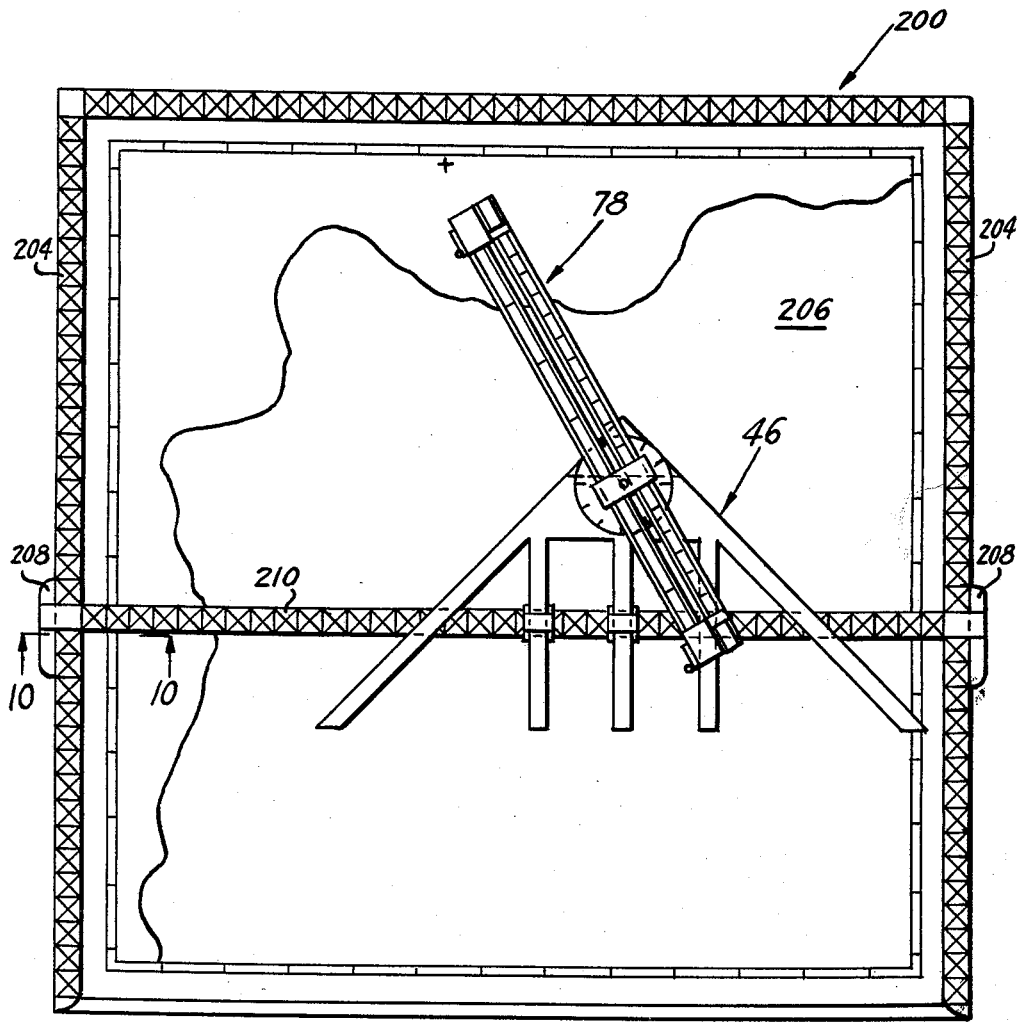
FIG. 9 is a top plan view of an alternate embodiment of the present invention.
Figure 10:
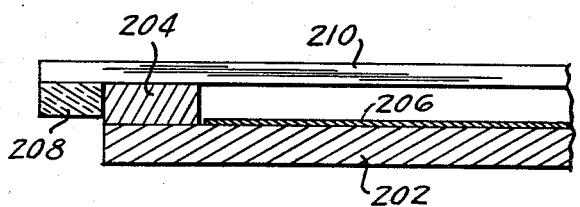
FIG. 10 is a fragmentary sectional view taken on line 10—10 of FIG. 9, but with the frame removed.

A modified form of the invention is illustrated generally at 200 in FIGS. 9 and 10. In this form of the invention, the table 202, of Plexiglas or the like, is provided with opposite side rails or platforms 204. The chart 206 or the like is placed on the table 202 between the side rails 204.

The side rails 204 act as guide means to slidably and laterally support flanges 208 depending from the ends of the transverse rule 210. With this type of construction, the device can be used with the table removed from the frame.

The other parts of the device shown in FIGS. 9 and 10 are similar to those shown in FIGS. 1 to 7.

Although this invention has been described in considerable detail, such description is intended as being illustrative rather than limiting, since the invention may be variously embodied, and the scope of the invention is to be determined as claimed.

Having thus set forth and described the nature of this invention, what is claimed is:

1. A navigational plotting and drafting device comprising a table, a transverse rule extending across said table, guide means on said transverse rule for holding said rule in slidable relation to said table, said table being adapted to hold a chart beneath said transverse rule, a carriage, means slidably mounting said carriage on said transverse rule in both lateral and longitudinal adjustable relationship thereto, a protractor on said carriage, an auxiliary rule removably and slidably positioned on said carriage in operative position relative to said protractor, slidable marking means on said auxiliary rule, and adjustable scale means on said auxiliary rule, said scale means being manually adjustable, wherein said auxiliary rule comprises two laterally spaced, parallel rule members, each of said rule members being channeled to receive a length of tape, one of said rule members having a spool at each of the opposite ends between which extends a non-stretchable tape, and the other rule member being provided with a spring tape extending from a spool at one end of said other rule member and having a finger for reception in a recess adjacent the opposite end of said other rule member.

2. The navigational plotting and drafting device of claim 1 wherein said marking means comprises a bridge slidable on said auxiliary rule and having a hole therein to accommodate the end of a marking device.

3. The navigational plotting and drafting device of claim 1 wherein said protractor is revolvable on a pivot pin set in said carriage, said pivot pin being slidably receivable in a space provided between two laterally spaced parallel rule members on said auxiliary rule.

4. The navigational plotting and drafting device of claim 1 wherein said table is removably positioned in a frame, said frame being constructed of channel portions overlying the corresponding edges of said table, said transverse rule having end portions slidable within said channel portions above said table, said end portions constituting said guide means, spaced holes in said frame, a hole in each of said end portions, and a removable pin adapted to be positioned in each of said holes in said end portions and simultaneously in a mating hole in said frame.

5. The navigational plotting and drafting device of claim 1 wherein said table is provided with opposed side rails and said transverse rule is provided with a dependent flange at each end, said flanges constituting said guide means, and said flanges being slidably engageable with said side rails.

6. A navigational and plotting device comprising in combination with a frame and a table removably positioned within said frame, a transverse rule slidable relative to said frame and said table, means to releasably lock said transverse rule in slidably adjusted position, a plurality of sockets slidably connected to said transverse rule for longitudinal adjustment therealong, a carriage having a plurality of legs slidably engaged in corresponding sockets for slidable adjustment transversely to the length of said transverse rule, a protractor on said carriage, said protractor being rotatably mounted on a pivot pin on said carriage, and an elongated auxiliary rule having a longitudinal slot adapted for releasable and slidable engagement with said pivot pin, said auxiliary rule having an adjustable linear scale thereon, wherein said auxiliary rule comprises two laterally spaced, parallel rule members, each of said rule members being channeled to receive a length of tape, one of said rule members having a spool at each of the opposite ends between which extends a non-stretchable tape, and the other rule member being provided with a spring tape extending from a spool at one end of said other rule member having a finger for reception in a recess adjacent the opposite end of said other rule member.

7. The combination of claim 6 wherein said carriage is triangular and is provided with angular extensions of the sides defining its apex, said legs extending from the base edge of said triangular carriage opposite its apex and being positioned between said angular extensions.

8. The combination of claim 6 wherein said means to releasably lock said transverse rule comprises a series of spaced holes in said frame on opposite sides thereof, a flange on each end of said transverse rule, said flanges being slidable in said frame, a hole in each of said flanges adapted to selectively mate with one of the holes in said frame, and a pin removably engaged in the hole in each flange and in a mating hole in said frame.

9. The combination of claim 6 wherein said frame and said transverse rule are provided with linear scales thereon.

References Cited in the file of this patent
UNITED STATES PATENTS

| | | |
|---|---|---|
| 964,773 | Guillo | July 19, 1910 |
| 977,829 | Ourdan | Dec. 6, 1910 |
| 1,436,415 | Sullivan | Nov. 21, 1922 |
| 1,512,015 | Butz et al. | Oct. 21, 1924 |
| 2,633,644 | May | Apr. 7, 1953 |